(12) United States Patent
December

(10) Patent No.: US 6,376,616 B1
(45) Date of Patent: Apr. 23, 2002

(54) PIGMENT DISPERSANTS HAVING ANIONIC FUNCTIONALITY FOR USE IN ANODIC ELECTROCOAT COMPOSITIONS

(75) Inventor: Timothy S. December, Rochester, MI (US)

(73) Assignee: BASF Corporation, Southfield, MI (US)

( * ) Notice: Subject to any disclaimer, the term of this patent is extended or adjusted under 35 U.S.C. 154(b) by 0 days.

(21) Appl. No.: 09/467,256

(22) Filed: Dec. 20, 1999

(51) Int. Cl.$^7$ .............................................. C08F 263/00
(52) U.S. Cl. ...................................... 525/278
(58) Field of Search ......................... 525/278

(56) References Cited

U.S. PATENT DOCUMENTS

| | | | |
|---|---|---|---|
| 4,230,844 A | * 10/1980 | Chang | .................... 526/210 |
| 4,421,902 A | * 12/1983 | Chang | .................... 526/317 |
| 4,429,097 A | * 1/1984 | Chang | .................... 526/317 |
| 4,663,385 A | * 5/1987 | Chang | .................... 524/523 |
| 5,102,936 A | 4/1992 | Carpenter et al. | ........... 524/247 |
| 5,320,673 A | 6/1994 | Carpenter | |
| 5,378,762 A | 1/1995 | Czornij et al. | |
| 5,527,614 A | 6/1996 | Carpenter et al. | |
| 5,536,776 A | 7/1996 | Carpenter et al. | |
| 5,605,974 A | 2/1997 | Carpenter et al. | |
| 5,880,238 A | * 3/1999 | Bafford | .................... 526/318 |
| 6,075,089 A | * 6/2000 | Jaeger | .................... 524/762 |
| 6,160,048 A | * 12/2000 | Uyeda | .................... 524/504 |

FOREIGN PATENT DOCUMENTS

| EP | 0 569 907 A2 | 5/1993 | ............ C09D/7/02 |
| EP | WO00/37560 | 11/1999 | ............ C08L/57/12 |

OTHER PUBLICATIONS

BASF Corporation, International Search Report in English PCT/US 00/30557, 06, 11,2000 on 03 pages.

* cited by examiner

*Primary Examiner*—Paul R. Michl
(74) *Attorney, Agent, or Firm*—Mary E. Golota

(57) ABSTRACT

The present invention provides a compound having anionic functional groups that is useful as a pigment dispersant in waterborne coating compositions, particularly in anodic electrocoat compositions. The compound comprises an acrylic backbone having a stabilizing substituent and a plurality of anionic groups. The anionic groups result from the incorporation of a plurality of acid groups into the acrylic backbone followed by reaction with organic amine.

11 Claims, No Drawings

PIGMENT DISPERSANTS HAVING ANIONIC FUNCTIONALITY FOR USE IN ANODIC ELECTROCOAT COMPOSITIONS

FIELD OF THE INVENTION

The invention relates to the pigment dispersants for use in aqueous coating compositions. More particularly, the invention is directed to pigment dispersants comprising a plurality of anionic groups for use in anodic electrocoat coating compositions.

BACKGROUND OF THE INVENTION

Electrocoating, or electrodeposition coating, is widely used in the art for the application of polymeric coatings to electrically conductive substrates. In the electrocoat process, the substrate to be coated is used as one electrode in an electrical cell so that a current passed through the aqueous bath will deposit the coating onto the substrate. One of the advantages of electrocoat compositions and processes is that the applied coating composition forms a uniform and contiguous layer over a variety of metallic substrates regardless of shape or configuration. This is especially advantageous when the coating is applied as an anticorrosive coating onto a substrate having an irregular surface, such as a motor vehicle body. The even, continuous coating layer over all portions of the metallic substrate provides maximum anti-corrosion effectiveness.

Electrocoat baths usually comprise an aqueous dispersion of a principal film-forming resin, such as an acrylic or epoxy resin, having ionic stabilization. For automotive or industrial applications where hard electrocoat films are desired, the electrocoat coating compositions are formulated to be curable compositions. Usually, this is accomplished by including in the bath a crosslinking agent that can react with functional groups on the principal resin under appropriate conditions (e.g., with the application of heat) and thus cure the coating. Alternatively, the principal resin may be a self-crosslinking resin, having on the same resin one or more kinds of groups that are reactive toward each under the appropriate curing conditions.

Pigments are included in the composition for decorative effect and also, in the common situation where the electrocoat is used as a primer, to enhance the corrosion protection properties of the coating. In either case, it is essential that the pigment be well-dispersed in the electrocoat bath in order to promote bath stability, as well as adequate and uniform dispersion of the pigment in the deposited and subsequently cured coating. It is desirable to have the pigment dispersant molecules cure into the film to develop optimum properties in the cured coating. For this to happen, the dispersant molecule must carry one or more groups reactive toward either the principal resin or, if included, the crosslinking agent. When the dispersant molecule is reacted into the cured film it is possible to thereby increase the integrity of the film, as well as to prevent the dispersant from acting as a water-sensitive plasticizer in the cured film.

The dispersant compound of the invention has a polymeric acrylic backbone on which are a plurality of anionic groups and a stabilizing substituent. The stabilizing substituent provides nonionic stabilization in the electrocoat composition. Until now, dispersants have usually been only ionically stabilized. In addition, such dispersants usually have been either monomeric or epoxy-based compounds. Such dispersants are described, for example, in U.S. Pat. No. 3,947,339 (describing a cationic pigment dispersant that is the reaction product of stearyl glycidyl ether and N-methyl ethanolamine; a cationic resin for pigment dispersion that is the reaction product of a polyglycidyl ether of Bisphenol A with epoxy equivalent weight of 500 and diethylamine; and an alkyl imidazoline as a pigment dispersant); U.S. Pat. No. 5,281,316 (describing a pigment grinding vehicle prepared from a diglycidyl ether of Bisphenol A with epoxy equivalent weight of about 200, Bisphenol A, 2-ethylhexanol-half-capped toluene diisocyanate, and a quaternizing agent prepared by reacting dimethylethanolamine with 2-ethylhexanol-half-capped toluene diisocyanate); U.S. Pat. No. 4,443,569 (describing an epoxy-acrylic graft copolymer used to disperse pigments); and U.S. Pat. No. 4,769,400 (describing a grind resin prepared by reacting an epoxy resin based on bisphenol A, having an epoxy equivalent weight of 890, with diethanolamine).

Such methods often require lengthy processing times and are particularly ineffective for dispersing organic pigments in the electrocoat bath. Compared to the dispersions of the invention, the prior art dispersions have relatively poor color development and stability. Also, the ratio of pigment solids to resin solids by weight (often referred to as the pigment to binder ratio) is often relatively low for the prior art pigment paste dispersions. A higher pigment to binder ratio is desirable because it increases manufacturing efficiency. Furthermore, the compounds of this invention provide significant and unexpected advantages in reduced milling times and greater formulating latitude when the pigment paste dispersions are incorporated into paint compositions.

In U.S. Pat. No. 5,231,134, Carpenter et al. describe a pigment dispersant for cathodic electrocoating compositions that is prepared by polymerizing an ethylenically unsaturated monomer containing an isocyanate group with other ethylenically unsaturated monomers, and reacting the isocyanate group stepwise or simultaneously with a polyalkylene glycol monoalkyl ether and/or an amino-terminated polyalkylene glycol monoalkyl ether, and a compound containing at least a tertiary amine group and one functional group capable of reacting with the isocyanate group. The invention of the patent, like the present invention, provides good pigment pastes or pigment dispersions that, when used in an electrocoat bath, have less pigment settling and allow for use of a reduced amount of pigment and a reduced amount of volatile organics.

However, the instant invention relates to pigment dispersion useful in anodic electrocoat compositions rather than cathodic. Moreover, the present invention has an advantage over the prior dispersant of Carpenter et al. because the present invention can be reacted into the film when the coating is deposited on the substrate and cured. Reaction of the pigment dispersant into the film is desired in order to obtain optimum film integrity, physical properties, and durability.

SUMMARY OF THE INVENTION

The present invention provides, in one aspect, a compound useful as a dispersant for pigments in anodic electrocoat coating compositions. The dispersant compound has an acrylic backbone and on the acrylic backbone a plurality of anionic groups and a stabilizing substituent. The plurality of anionic groups resulting from reaction of a plurality of acid groups, preferably carboxylic acid groups, with a basic compound such as organic amines and hydroxide containing compounds. The stabilizing substituent comprises an alkoxy-terminated polyalkylene oxide structure, —D(CHR$_1$CH$_2$O—)$_n$R$_2$. D is a divalent radical selected from —O— or —NR$_3$—, where R$_3$ is hydrogen or alkyl of one to twelve carbon atoms. $R_1$ is hydrogen or a mixture of hydrogen and alkyl of one to eight carbon atoms. Thus, the stabilizing substituent comprises either polyethylene oxide or a polyethylene oxide/polyalkylene oxide copolymer, having a degree of polymerization of n, n being an integer from one to one thousand. $R_2$ is alkyl of one to thirty carbon atoms. The amount of anionic groups must be balanced to achieve the optimimum balance between dispersant solubility and low conductivity for optimum electrodeposition of the anodic electrocoat coating composition.

The present invention further provides a method of dispersing a pigment with the dispersant compound.

The invention also provides an electrocoat coating composition comprising an aqueous dispersion of a water-dispersible, electrically-depositable, at least partially neutralized anionic resin, as well as the dispersant compound of the invention and at least one pigment that is dispersed with the dispersant compound.

Finally, the invention provides a method of coating a substrate with the electrocoat coating composition of the invention and of curing the deposited coating composition to produce a coated article.

The compounds of the invention provide an effective means of dispersing pigments. Exceptional stability is achieved. The ease of dispersion of these pigments using the compounds of the invention allows for reduced processing times and increased pigment concentrations in forming the pigment pastes. The pigment pastes formed according to the present invention also require a very low level of organic solvents or cosolvents in comparison to pigment pastes previously used. The combination of increased pigment concentration and reduced organic cosolvents in the pigment paste allow for greater latitude in formulating a coating composition, especially a coating composition having a lower content of volatile organic compounds. Additionally, an increased concentration of pigment in the pigment paste and reduced milling times improves manufacturing efficiency and reduces costs associated with the manufacture of the pigment paste dispersion. Finally, the particular anionic pigment dispersion of the invention allows these advantages to be realized in anodic electrocoats, something which the prior art has been unable to achieve.

The compounds of the present invention also offer an advantage for dispersing organic pigments. This advantage is particularly critical where the electrocoated article will not be overcoated with another coating. In this case, film integrity and durability, as well as color styling, are of great importance.

When used in an electrocoating process, the coating composition of the invention provides a smooth, contiguous coating over a variety of portions of the metal substrate, including recessed areas and edges. The dispersant can be reacted into the film to give optimum film integrity and physical properties. The coating composition is thus highly effective as an anticorrosive primer coating for metal substrates, particularly for motor vehicle bodies. The dispersant is also effective for dispersing many organic pigments that are otherwise difficult to disperse in electrocoat compositions. The coating composition of the invention is thus particularly suited to color coatings of high durability.

DETAILED DESCRIPTION OF THE PREFERRED EMBODIMENT

The pigment dispersant compound useful for electrocoating compositions comprises an acrylic backbone having a plurality of anionic groups and at least one polyalkylene oxide-based stabilizing substituent. The dispersant may be formed by different methods. According to a preferred method, the acrylic backbone is first formed by the reaction of ethylenically unsaturated monomers, including at least one monomer (i) with functionality that is used after the polymerization to incorporate the precursor groups to the anionic groups and the stabilizing substituent onto the acrylic backbone.

The order of incorporation of the substituents, or method of incorporating each substituent is not critical.

The anionic groups of the acrylic backbone are a necessary element of the instant invention and will generally be the reaction product of a pendant acid group and a basic compound. The term "anionic precursor group" as used as above thus most preferably refers to a compound comprising at least one acid group.

In the preferred method for incorporating the required acid groups into the acrylic backbone polymer the pendant acid group will derive from the graft of a free organic acid to the acrylic backbone, wherein such free organic acid has a functional group reactive with the backbone polymer, particularly with the functional group of monomer (i).

Examples of free organic acids which may be used to graft a free organic acid group, preferably a pendant carboxylic acid group to the acrylic backbone include compounds of the formula HO—(R)—COOH or an amine salt of the formula HO—(R)—COOH$^+$NR$_3$, wherein R is an alkyl group of from 1 to 12 carbons, preferably from 2 to 8 carbons. Polyacids such as malic acid and citric acid may also be used. Preferred organic free acids are lactic acid, glycolic acid and stearic acid. Hydroxy stearic acids are most preferred.

The monomer (i) with functionality reactive toward the anionic precursor groups and/or the stabilizing substituent preferably has epoxy, or isocyanate functionality. More preferably, monomer (i) has isocyanate functionality.

If the monomer (i) has epoxy functionality, it will react with an acid on the substituent molecule to form a β-hydroxy ester linkage or with an amine on the substituent molecule to form a β-hydroxy amine linkage. If the substituent molecule has hydroxyl functionality, the hydroxyl group may be first reacted with an anhydride of a dicarboxylic acid to form an acid-functional substituent molecule and then reacted with the epoxy group on the acrylic backbone to form the β-hydroxy ester linkage. Representative monomers (i) with epoxy functionality are epoxy glycidyl esters of unsaturated acids such as glycidyl methacrylate, glycidyl acrylate, and allyl glycidyl ether.

If the monomer (i) has isocyanate functionality, it will react with a hydroxyl on the substituent molecule to form a urethane linkage or with an amine on the substituent molecule to form a urea linkage. Examples of suitable ethylenically unsaturated isocyanate compounds are isocyanatoethyl methacrylate, isocyanatoethyl acrylate, vinyl isocyanate, isopropenyl isocyanate, and meta-isopropenyl-α,α-dimethylbenzyl isocyanate. Meta-isopropenyl-α,α-dimethylbenzyl isocyanate is available from American Cyanamid Company, Wayne, New Jersey under the trade name "TMI™(Meta) unsaturated aliphatic isocyanate," and is described in American Cyanamid Company's publication "TMI™(Meta) unsaturated aliphatic isocyanate", publication number 2-849 1/88.

Any unreacted functionality from monomer (i) left on the acrylic polymer may be used during the crosslinking reaction or, optionally, reacted with a compound to consume the residual functionality. Such compounds are, for example, mono- or diamines or mono- or polyols. Representative examples of specific compounds are isopropyl amine, t-butyl amine, ethylene diamine, butanol, isopropanol, and 1,6-hexanediol.

The acrylic backbone is formed by reaction of the monomer (i) with other ethylenically unsaturated monomers. Suitable other ethylenically unsaturated monomers that may be used in forming a copolymer with the substituent monomer(s) include esters or nitriles or amides of $\alpha,\beta$-ethylenically unsaturated monocarboxylic acids containing 3 to 5 carbon atoms; esters of $\alpha,\beta$-ethylenically unsaturated dicarboxylic acids containing 4 to 6 carbon atoms; vinyl esters, vinyl ethers, vinyl ketones, vinyl amides, and vinyl compounds of aromatics and heterocycles. Representative examples include acrylic and methacrylic acid amides and aminoalkyl amides; acrylonitrile and methacrylonitriles; esters of acrylic and methacrylic acid, particularly those with saturated aliphatic and cycloaliphatic alcohols containing 1 to 20 carbon atoms such as methyl, ethyl, propyl, butyl, 2-ethylhexyl, isobutyl, isopropyl, cyclohexyl, tetrahydrofurfuryl, and isobornyl acrylates and methacrylates, as well as hydroxy and amine hydroxyalkyl acrylates and methacrylates such as hydroxyethyl, hyroxypropyl, and hydroxybutyl acrylates and methacrylates, and aminoalkyl esters of methacrylic or acrylic acid like N,N-dimethylaminoethyl (meth)acrylate and t-butylamino ethyl (meth)acrylate; esters of fumaric, maleic, and itaconic acids, like maleic acid dimethyl ester and maleic acid monohexyl ester; vinyl acetate, vinyl propionate, vinyl ethyl ether, and vinyl ethyl ketone; styrene, $\alpha$-methyl styrene, vinyl toluene, and 2-vinyl pyrrolidone.

The copolymers may be prepared by using conventional techniques, such as free radical polymerization, cationic polymerization, or anionic polymerization, in, for example, a batch or semi-batch process. For instance, the polymerization may be carried out by heating the ethylenically unsaturated monomers in bulk or in organic solution in the presence of a free radical source, such as an organic peroxide or azo compound and, optionally, a chain transfer agent for a batch process; or, alternatively, the monomers and initiator (s) may be fed into the heated reactor at a controlled rate in a semi-batch process.

The polymerization reaction may be, for example, a free radical polymerization carried out in solution using solvents such as ketones, esters, glycol ethers, aromatic hydrocarbons, alkanes, cyclic alkanes, or mixtures of these solvents. Illustrative examples of ketones are acetone, methyl isobutyl ketone, methyl ethyl ketone, methyl propyl ketone, methyl amyl ketone; examples of esters are butyl acetate, ethyl acetate, and pentyl propionate; examples of glycol ethers are diethylene glycol dimethyl ether, ethylene glycol butyl ether, and propylene glycol methyl ether acetate; examples of aromatic hydrocarbons are toluene, xylene, naphthas, and mineral spirits; and examples of alkanes and cyclic alkanes are cyclohexane, hexane, and heptane. Preferred solvents are ketones.

Typical free radical sources are organic peroxides such as dialkyl peroxides, peroxyesters, peroxydicarbonates, diacyl peroxides, hydroperoxides, and peroxyketals; and azo compounds such as 2,2'-azobis(2-methylbutanenitrile) and 1,1'-azobis(cyclohexanecarbonitrile). Typical chain transfer agents are mercaptans such as octyl mercaptan, n- or tert-dodecyl mercaptan, thiosalicyclic acid, mercaptoacetic acid, and mercaptoethanol; halogenated compounds, and dimeric alpha-methyl styrene.

The free radical polymerization is usually carried out at temperatures from about 20° C. to about 200° C., preferably from 90° C. to 170° C. The reaction may conveniently be done at the temperature at which the solvent or solvent mixture refluxes, although reflux is not necessary to the reaction. The reaction temperature may be below reflux during the reaction; however, such temperature is then preferably held constant during the course of the reaction. The initiator should be chosen to match the temperature at which the reaction is carried out, so that the half-life of the initiator at the reaction temperature should preferably be no more than thirty minutes.

In a preferred embodiment, the ethylenically unsaturated monomer (i) is meta-isopropenyl-$\alpha,\alpha$-dimethylbenzyl isocyanate. The free radical polymerization with meta-isopropenyl-$\alpha,\alpha$-dimethylbenzyl isocyanate is usually carried out at temperatures from about 20° C. to about 200° C., preferably from 90° C. to 170° C., more preferably from 120° C. to 160° C. Generally, the amount of meta-isopropenyl-$\alpha,\alpha$-dimethylbenzyl isocyanate that may be incorporated into the addition polymer by free radical polymerization increases with increasing reaction temperature.

The solvent or solvent mixture is generally heated to the reaction temperature and the monomers and initiator(s) are added at a controlled rate over a period of time, usually between one and eight hours. A chain transfer agent or additional solvent may be added concurrently with the monomers and initiator(s). The mixture is usually held at the reaction temperature after the additions for a period of time to complete the reaction. Optionally, additional initiator may be added during the latter stages of the addition or after the addition is completed in order to ensure complete conversion. The acrylic copolymer preferably has a weight average molecular weight of at least 1000, preferably from 2000 to 50,000 and more preferably from 3000 to 20,000. The weight average molecular weight is determined by gel permeation chromatography using polystyrene standards. The acrylic copolymer may be further characterized by an acid number of from 20 to 80, preferably an acid number of from 30 to 50 and most preferably an acid number of from 30 to 35.

The order in which the stabilizing substituent and the anionic group precursor (if used) are reacted onto the acrylic backbone is not critical, and, in general, whether the one or more compounds are added simultaneously or sequentially will depend upon the particular functionalities chosen. The reactions between the stabilizing substituent and the anionic group precursor with the polymeric backbone may be done neat or in solution. Addition of a solvent that is inert toward the reactants is preferred when the viscosity would otherwise be too high to achieve adequate mixing. Solvents containing hydroxyl groups and other active hydrogens are not preferred. Useful solvents include aromatic and aliphatic hydrocarbons, esters, ethers, and ketones. Such solvents as toluene, xylene, ethyl acetate, acetone, methyl isobutyl ketone, methyl ethyl ketone, methyl propyl ketone, methyl amyl ketone, mineral spirits, ethylene or propylene glycol ether acetates, and other compatible solvents may be useful.

The formation of the required anionic groups occurs via reaction between the plurality of acid groups, preferably carboxylic acid groups, on the acrylic backbone and a basic compound. Illustrative basic compounds include Lewis and Brönstead bases. Examples of suitable bases for use in base-salting or neutralizing the polymer (a) include amines and hydroxide compounds such as potassium hydroxide and sodium hydroxide. Amines are preferred. Illustrative amines include N,N-dimethylethylamine (DMEA), N,N-diethylmethylamine, triethylamine, triethanolamine, triisopropylamine, dimethylethanolamine, diethylethanolamine, diisopropylethanolamine, dibutylethanolamine, methyldiethanolamine, dimethylisopropanolamine, methyldiisopropanolamine, dimethylethanolamine, and the like. Preferred amines are tertiary amines such as dimethylethylamine and dimethylethanolamine.

The degree to which the acid groups are neutralized or base-salted depends on the necessary balance between solubility of the pigment dispersant and the need to maintain low conductivity in the electrocoat bath to ensure optimum deposition of the anodic electrocoat composition. In general, it has been found that the modified copolymer should only be partally neutralized. In a preferred embodiment, from 40 to 80% of the acid groups will be base-salted and more preferably from 50 to 70%. The meq Acid of the modified copolymer will be from 0.45 to 0.85 meq Acid/gram polymer solids, and more preferably from 0.55 to 0.75 meq Acid/gram polymer solids. The meq Base will from 0.2 to 0.7 meq Base/gram polymer solids, and most preferably from 0.3 to 0.5 meq Base/gram polymer solids.

The stabilizing substituent has a terminal hydrophilic portion, represented by —D(CH($R_1$)CH$_2$O—)$_n$$R_2$. D is a divalent radical selected from —O— or —NR$_3$—, where $R_3$ is hydrogen or alkyl of one to twelve carbon atoms. D is preferably —O— or —NH—. The stabilizing substituent may be formed by the reaction of an alkoxy poly (oxyalkylene) alcohol or with an alkoxy poly(oxyalkylene) amine either with a reactive group on the acrylic backbone or with a compound that in turn has functionality reactive with the acrylic backbone. The alkoxy poly(oxyalkylene) alcohol or alkoxy poly(oxyalkylene) amine employed can be formed by the alkoxylation of monohydric alcohols with ethylene oxide or mixtures of ethylene oxide with other alkylene oxides of up to ten carbon atoms, such as propylene oxide or butylene oxide. $R_1$ is thus either hydrogen or a mixture of hydrogen and alkyls of one to eight carbon atoms. It is particularly advantageous for $R_1$ to be either hydrogen or a mixture of hydrogen and alkyls of one to three carbon atoms.

The alkoxy poly(oxyalkylene) alcohol or alkoxy poly (oxyalkylene) amine has a degree of polymerization of n, n being an integer from one to one thousand. Preferably, n is an integer from 20 to 200; more preferably, from 30 to 70. $R_2$ is an alkyl of one to thirty carbon atoms. In a particularly preferred embodiment $R_1$ is hydrogen and $R_2$ is methyl. The stabilizing substituent is present in the dispersant compound in an amount between 20% and 60% by weight, preferably between 25% and 45% by weight.

The pigments are preferably dispersed first in an aqueous concentrate containing the pigment(s) and compound(s) of the invention, said concentrate being commonly called a pigment grind or pigment paste. The pigment pastes are mixed with such ingredients as polymers, crosslinkers, and additional solvents (including additional water) to form an aqueous coating composition.

Pigments may be present in the composition in amounts between 0 and 35% by weight, based on total weight of solids in the coating composition. Preferably, between 15 and 25% pigment is used, based on total weight of solids in the coating composition. The pigments used may be inorganic pigments, including metal oxides, chromates, molybdates, phosphates, and silicates. Examples of inorganic pigments that could be employed are titanium dioxide, barium sulfate, carbon black, ocher, sienna, umber, hematite, limonite, red iron oxide, transparent red iron oxide, black iron oxide, brown iron oxide, chromium oxide green, strontium chromate, zinc phosphate, silicas such as fumed silica, talc, barytes, ferric ferrocyanide (Prussian blue), ultramarine, lead chromate, lead molybdate, and lead silicate. Organic pigments may also be used. Examples of useful organic pigments are metallized and non-metallized azo reds, quinacridone reds and violets, perylene reds, copper phthalocyanine blues and greens, carbazole violet, monoarylide and diarylide yellows, benzimidazolone yellows, tolyl orange, naphthol orange, and the like.

The preferred pigments depend upon the desired color of the coating. When the coating applied is a primer, carbon black, titanium dioxide, extender pigments such as clay, and anti-corrosion pigments are commonly included.

It is normally necessary that the pigments be ground in the presence of the dispersant compound. The grinding may be done using methods and equipment known to the art. A basic discussion is provided in *Federation Series On Coatings Technology, Unit Sixteen: Dispersion and Grinding* (Pub. by Federation of Societies for Paint Technology, Philadelphia, Pa., 1970), incorporated herein by reference.

Preferably, a premix is first prepared by stirring together the pigment to be ground, the dispersant compound and solvent. The pigment may be added to a mixture of the dispersant, water, and a cosolvent with mixing to form a premix. Preferably, the solvent is water or a water compatible solvent. The solvent may be, for example, a glycol ether, glycol ether acetate, ester, water, or combination of these. The solvent is preferably a mixture of water and a cosolvent, such as a glycol ether or a glycol ether acetate. A particularly preferred mixture is 50–98% water with the balance being a glycol ether. A sufficient amount of solvent is used to produce a final paste of workable viscosity. The appropriate amount depends upon the type of pigment to be ground, and can readily be determined by one skilled in the art. As a guideline, it is necessary to use more solvent for pigments having higher surface areas. A pigment paste of a high surface area pigment may have a 10–25% solids content, whereas a low surface area pigment may be made into a paste having 60% or more solids content.

The pigment to binder ratio used in preparing pigment pastes varies according to the pigment and is readily determined by one skilled in the art. For example, a formulation having too high of a pigment to binder ratio results in an unworkable viscosity during the grinding process. A pigment having a high surface area may require at least two parts by weight of the dispersant compound per one part by weight of the pigment (pigment to binder ratio=0.5). A pigment having low surface area may require only one part by weight of the dispersant compound per 50–100 parts by weight of the pigment (pigment to binder ratio=50–100). However, the use of the anionic pigment dispersant of the invention allows the use of pigment to binder ratios greater than 5/1 and up to 10/1. Preferably, the pigment to binder ratio in practicing the invention is between 5/1 and 9/1, and most preferably between 6/1 and 8/1.

After the premix is prepared, it is ground to reduce the pigment to the desired particle size. The grinding may be accomplished by introducing the pigment into a grinding mill, such as a horizontal mill, a roller mill, a ball or pebble mill, a sand mill, or an attritor. Horizontal mills, such as the kind manufactured by Eiger Machinery, Inc., Bensenville, Ill., are very efficient for producing pigment pastes of the instant invention. The grinding in the grinding mill is continued until the desired maximum particle size is obtained. The maximum particle size is preferably between 0.1 and 10 microns and more preferably less than six microns.

The pigment paste is added to an aqueous dispersion of at least the principal film-forming resin (a) in making the electrocoat coating compositions of the invention. A variety of such resins are known including but not limited to acrylic, polyester, epoxy, polybutadiene, and carbamate functional. Preferably, the principal resin is anodic, i.e., it has acidic groups and is salted with an base. In an anodic electrocoating process, the article to be coated is the anode. Water-dispersible resins used in the anodic electrodeposition coating process have a anionic functional group such as an acid group such as a carboxylic acid group.

The resin (a) may be an epoxy resin functionalized with carboxylic acid groups. Preferably, the epoxy resin is prepared from a polyglycidyl ether. Preferably, the polyglycidyl ether is the polyglycidyl ether of bisphenol A or similar polyphenols. It may also be advantageous to extend the epoxy resin by reacting an excess of epoxide group equivalents with a modifying material, such as a polyol or a polycarboxylic acid, in order to improve the film properties. Preferably, the polyglycidyl ether is extended with bisphenol A. Useful epoxy resins of this kind have a weight average molecular weight, which can be determined by GPC, of 3000 to 6000. Epoxy equivalent weights can range from 200 to 2500, and are preferably from 870 to 1900.

Acid groups can be incorporated into the principal anodic resin (a) as discussed above with respect to the pigment dispersant of the invention.

Epoxy-modified novolacs can be used as the resin in the present invention. The epoxy-novolac resin can be capped in the same way as previously described for the epoxy resin.

Acrylic polymers may be made anodic by incorporation of acid-containing monomers, such as discussed above, followed by neutralization with a base such discussed above. Alternatively, epoxy groups may be incorporated by including an epoxy-functional monomer in the polymerization reaction. Such epoxy-functional acrylic polymers may be made anodic by reaction of the epoxy groups with acid functional compounds having at least one functional group reactive with the epoxy group. The molecular weight of a typical acrylic resin is usually in the range from 2000 to 50,000, and preferably 3000 to 15,000.

Anionic polyurethanes and polyesters may also be used. Such materials may be prepared by endcapping with, for example, an acid containing compound or, in the case of the polyurethane, the same compound comprising at least one acid group may also be useful.

Polybutadiene, polyisoprene, or other epoxy-modified rubber-based polymers can be used as the resin in the present invention. The epoxy-rubber can be capped with an acid group containing compound.

The meq Acid/grams per polymer of the anodic resin can range from 0.25 to 0.75, and preferably 0.35 to 0.65. The meq Base/grams per polymer of the anodic resin can range from 0.12 to 0.38, and preferably 0.17 to 0.32. The hydroxyl equivalent weight of the resins, if they have OH groups, is generally between 150 and 2000, and preferably 200 to 800. In the most preferred embodiment, the acid groups are salted with a basic compound such as discussed above with respect to the neutralization of the modified copolymer pigment dispersant.

In the most preferred embodiment however, the principal anodic resin (a) will be a carbamate functional anodic resin such as described in U.S. patent application Ser. No. 09/217,557, entitled "ANODIC ELECTROCOAT HAVING A CARBAMATE FUNCTIONAL RESIN" to Timothy S. December, the entire application of which is incorporated herein by reference.

The most preferred polymer (a) will have at least one carbamate functional group appended to a polymer backbone, preferably a plurality of pendant carbamate functional groups.

Polymer (a) can be prepared in a variety of ways. One way to prepare such polymers is to prepare an acrylic monomer having a carbamate functionality in the ester portion of the monomer. Such monomers are well-known in the art and are described, for example in U.S. Pat. Nos. 3,479,328, 3,674,838, 4,126,747, 4,279,833, and 4,340,497, the disclosures of which are incorporated herein by reference. One method of synthesis involves reaction of a hydroxy ester with urea to form the carbamyloxy carboxylate (i.e., carbamate-modified acrylic). Another method of synthesis reacts an ($\alpha,\beta$-unsaturated acid ester with a hydroxy carbamate ester to form the carbamyloxy carboxylate. Yet another technique involves formation of a hydroxyalkyl carbamate by reacting a primary or secondary amine or diamine with a cyclic carbonate such as ethylene carbonate. The hydroxyl group on the hydroxyalkyl carbamate is then esterified by reaction with acrylic or methacrylic acid to form the monomer. Other methods of preparing carbamate-modified acrylic monomers are described in the art, and can be utilized as well. The acrylic monomer can then be polymerized along with other ethylenically-unsaturated monomers, if desired, by techniques well-known in the art. However, such ethylenically unsaturated monomers must comprise at least one monomer having a pendant carboxylic acid group.

For example, preferred methods of preparing the polymer (a) of the invention include the following.

One or more carbamate functional monomers such as 2-carbamate ethyl methyacrylate (CEMA) may be copolymerized with two or more monomers such as an unsaturated organic acid and a alkyl ester of an unsaturated organic acid in the presence of a suitable initiator such as an azo or peroxide initiator. Other suitable carbamate functional monomers include those described above. Suitable unsaturated organic acids will be of the formulas $R^1R^2\!=\!R^3COOH$ or $R^1R^2\!=\!R^3R^4COOH$, where $R^1$, $R^2$, $R^3$, and $R^4$ may be the same or different and are selected from the group consisting of H, alkyl groups of from 2 to 12 carbons, and mixtures thereof. Examples of suitable unsaturated organic acids include acrylic acid, methacrylic acid, crotoic acid, vinylacetate acid, tiglic acid, 3,3-dimethylacrylic acid, trans-2-pentenoic acid, 4-pentenoic acid, trans-2-methyl-2-pentenoic acid, 6-heptanoic acid, 2-octenoic acid, and the like. Preferred unsaturated organic acids include acrylic acid, methacrylic acid, and mixtures thereof. Examples of suitable alkyl esters of unsaturated organic acid include ethyl acrylate, butyl acrylate, 2-ethylhexyl acrylate, butyl methyacrylate, isodecyl methyacrylate, hydroxyethyl methacrylate, hydroxypropyl methacrylate, and the like. Preferred alkyl esters are nonhydroxy functional esters such as butyl acrylate and butylmethacrylate.

Other ethylenically unsaturated monomers such as styrene may be used to form repeating units A, discussed below.

In another reaction scheme, an isocyanate functional monomer such as unsaturated m-tetramethyl xylene isocyanate (sold by American Cyanamid as TMI®) can be copolymerized with monomers such as alkyl esters such as described immediately above such as butyl acrylate and unsaturated monomers such as styrene to produce an isocyanate functional polymer. The required carboxylic acid functionality and carbamate functionality can then be grafted onto the isocyanate functional polymer by a two-stage reaction having a first stage using a carbamate functional monomer such as hydroxypropyl carbamate followed by a second stage using a carboxylic acid of the formula HO—(R)—COOH or an amine salt of the formula HO—(R)—COOH⁺NR₃, wherein R is an alkyl group of from 1 to 12 carbons, preferably from 2 to 8 carbons.

Alternatively, one or more carbamate functional monomers may be reacted with an isocyanate functional monomer such as an unsaturated m-tetramethyl xylene isocyanate to produce a carbamate functional monomer. Additional isocyanate monomer may be added to introduce isocyanate functionality in the monomer mixture. After polymerizing the one or more monomers, the required pendant carboxylic acid functionality can be grafted onto the polymer backbone using a carboxylic acid functional compound having at least one group reactive with an isocyanate, such as a hydroxy carboxylic acid.

Alternatively, carbamate functional adducts made from polyisocyanate functional compounds such as IPDI or TDI and hydroxy carbamate compounds can be made and then grafted onto acrylic, epoxy or other hydroxy functional polymers having acid numbers of at least 20, preferably 30. Of course, it will be appreciated that such resins must have the characteristics required for in electrocoat compositions as discussed herein. Preferred polymers for use as the backbone are hydroxyl functional acrylic resins with acid numbers of at least 20, preferably at least 30.

A most preferred method of making the polymer (a) involves the copolymerization of at least one carbamate functional monomer, at least one unsaturated organic acid, at least one alkyl ester of an unsaturated organic acid and at least one additional ethylenically unsaturated monomer such as styrene. A most preferred reaction scheme involves the copolymerization of CEMA, acrylic acid, styrene and butyl acrylate in the presence of an azo or peroxide initiator.

The polymer component (a) can be represented by the randomly repeating units according to the following formula:

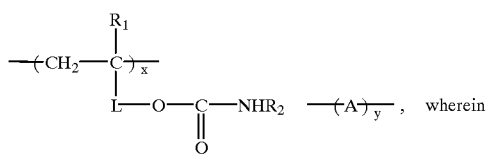

In the above formula, $R_1$ represents H or $CH_3$. $R_2$ represents H, alkyl, preferably of 1 to 6 carbon atoms, or cycloalkyl, preferably up to 6 ring carbon atoms. It is to be understood that the terms alkyl and cycloalkyl are to include substituted alkyl and cycloalkyl, such as halogen-substituted alkyl or cycloalkyl. Substituents that will have an adverse impact on the properties of the cured material, however, are to be avoided. For example, ether linkages are thought to be susceptible to hydrolysis, and should be avoided in locations that would place the ether linkage in the crosslink matrix. The values x and y represent weight percentages, with x being 10 to 90% and preferably 40 to 60%, and y being 90 to 10% and preferably 60 to 40%.

In the formula, A represents repeat units derived from one or more ethylenically unsaturated monomers, at least one of which repeat units must have a pendant carboxylic acid group. The at least one carboxylic acid group may derive from the use of at least one ethylenically unsaturated monomer having at least one carboxylic acid group, preferably a pendant or terminal carboxylic acid group. Alternatively, the at least one repeating unit having a pendant carboxylic acid may derive from the graft of a free organic acid to the polymer backbone of the repeating units (A), as discussed above, wherein such free organic acid has a functional group reactive with the backbone polymer.

Examples of ethylenically unsaturated monomers having a pendant carboxylic acid group include acrylic acid, methacrylic acid, crotoic acid, vinylacetate acid, tiglic acid, 3,3-dimethylacrylic acid, trans-2-pentenoic acid, 4-pentenoic acid, trans-2-methyl-2-pentenoic acid, 6-heptanoic acid, 2-octenoic acid, and the like. Preferred ethylenically unsaturated monomers having a pendant carboxylic acid are acrylic acid, methacrylic acid and mixtures there of.

Examples of free organic acids which may be used to graft a pendant carboxylic acid group to the backbone polymer include compounds of the formula HO—(R)—COOH or an amine salt of the formula HO—(R)—COOH⁺NR₃, wherein R is an alkyl group of from 1 to 12 carbons, preferably from 2 to 8 carbons. Polyacids such as malic acid and citric acid may also be used. Preferred organic free acids are lactic acid, glycolic acid and stearic acid.

Other monomers which may be utilitzed to provide repeating units (A) not having pendant carboxylic acid functionality are those monomers for copolymerization with acrylic monomers known in the art. These include alkyl esters of acrylic or methacrylic acid, e.g., ethyl acrylate, butyl acrylate, 2-ethylhexyl acrylate, butyl methacrylate, isodecyl methacrylate, hydroxyethyl methacrylate, hydroxypropyl acrylate, and the like; and vinyl monomers such as unsaturated m-tetramethyl xylene isocyanate (sold by American Cyanamid as TMI®), styrene, vinyl toluene and the like.

L represents a divalent linking group, preferably an aliphatic of 1 to 8 carbon atoms, cycloaliphatic, or aromatic linking group of 6 to 10 carbon atoms. Examples of L include

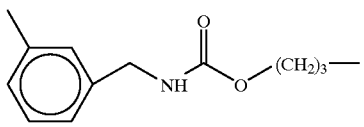

—(CH₂)—, —(CH₂)₂—, —(CH₂)₄—, and the like. In one preferred embodiment, —L— is represented by —COO—L'— where L' is a divalent linking group. Thus, in a preferred embodiment of the invention, the polymer component (a) is represented by randomly repeating units according to the following formula:

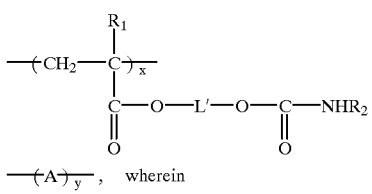

In this formula, $R_1$, $R_2$, A, x, and y are as defined above. L' may be a divalent aliphatic linking group, preferably of 1 to 8 carbon atoms, e.g., —(CH₂)—, —(CH₂)₂—, —(CH₂)₄—, and the like, or a divalent cycloaliphatic linking group, preferably up to 8 carbon atoms, e.g., cyclohexyl, and the like. However, other divalent linking groups can be used, depending on the technique used to prepare the polymer. For example, if a hydroxyalkyl carbamate is adducted onto an isocyanate-functional acrylic polymer, the linking group L' would include an —NHCOO— urethane linkage as a residue of the isocyanate group. Of course, A would still require the necessary pendant carboxylic acid groups as discussed above.

The polymer (a) will most preferably have a weight average molecular weight of 2000–100,000, and preferably from 10,000–60,000. Molecular weight can be determined by the GPC method using a polystyrene standard.

The glass transition temperature, $T_g$, of polymer (a) and any curing agent can be adjusted to achieve a cured coating having the $T_g$ for the particular application involved. The average $T_g$ of unreacted polymer (a) and any curing agent should be between 0° C. and 100° C., with the individual $T_g$'s being adjusted to achieve optimum performance.

The most preferred anodic principal resin (a) may be further characterized by an acid number of from 20 to 80, preferably an acid number of from 30 to 50 and most preferably an acid number of from 30 to 35. Most preferred resin (a) should also have a carbamate equivalent weight (grams of polymer (a)/equivalent of carbamate) of from 150 to 1200, preferably from 200 to 600, and most preferably from 300 to 400.

It be will appreciated that the various monomers and/or reactants used to make polymer (a) will be used in amounts necessary to obtain the required acid number, Tg, weight average molecular weight and carbamate equivalent weight.

The resin (a) is preferably able to be crosslinked with a crosslinking agent included in the coating composition. The crosslinker is a compound that can be reacted with the anionic resin after deposition of the coating on a substrate. The resin and the crosslinker react to form a crosslinker film on the substrate. A crosslinked film is particularly useful where an intractable, durable film is desired. Any of a number of crosslinking agents or curing agents may be used, depending upon the reactive functionality of the resin. Commonly-used crosslinking agents include blocked polyisocyanates, including isocyanurates of polyisocyanates (e.g., hexamethylene diisocyanate), and aminoplast crosslinkers. Useful polyisocyanates include toluene diisocyanate (TDI), methylene diphenyl diisocyanate (MDI), tetramethylxylene diisocyanate, hexamethylene diisocyanate, isophorone diisocyanate, and the biurets and isocyanurates of these isocyanates. In another preferred embodiment, the polyisocyanate is the reaction product of a diisocyanate and a polyol having less than twenty carbon atoms. The polyisocyanates are preferably pre-reacted with a blocking agent such an oxime, an alcohol, a lactam, or an amine, which blocks the isocyanate crosslinking functionality. Upon heating, the blocking agents separate and crosslinking occurs. In the most preferred embodiment, the crosslinking agent will be an aminoplast resin. Illustrative examples of suitable aminoplast resins include melamine formaldehyde resin (including monomeric or polymeric melamine resin and partially or fully alkylated melamine resin), urea resins (e.g., methylol ureas such as urea formaldehyde resin, alkoxy ureas such as butylated urea formaldehyde resin), benzoguanamine resins, glycol uril formaldehyde resins, polyanhydrides (e.g., polysuccinic anhydride), and polysiloxanes (e.g., trimethoxy siloxane). Aminoplast resin such as melamine formaldehyde resin or urea formaldehyde resin are especially preferred.

The electrodepositable coating compositions of the present invention are aqueous. The resin dispersion is usually made at 15 to 45 percent nonvolatiles, preferably from 30 to 40 percent nonvolatiles. The resin dispersion and the pigment dispersion are mixed together, and often further diluted with deionized water, to form the electrocoat bath. The electrocoat bath is usually 15 to 40 percent nonvolatile, preferably from 15 to 25 percent nonvolatile. The average particle size diameter of the resinous phase is about 0.1 to 10 microns, preferably less than 5 microns.

The ratio of pigment to resin can vary widely, depending on the pigments used and the desired properties of the finished film. For example, a black film may be deposited using 0.5 parts of carbon black to 99.5 parts of resin, while a white film may be plated using 50 parts of titanium dioxide to 50 parts of resin. Usually, the pigment is 10 to 40 percent of the nonvolatile material in the bath. Preferably, the pigment is 15 to 30 percent of the nonvolatile material in the bath.

The above components are uniformly dispersed in an aqueous medium containing base in an amount sufficient to neutralize enough of the ionic groups to impart water-dispersibility to the resin. The anionic resin may be fully neutralized; however, partial neutralization is usually sufficient to impart the required water-dispersibility. By "partial neutralization" we mean that at least one, but less than all, of the acidic groups on the resin are neutralized. By saying that the anionic resin is at least partially neutralized, we mean that at least one of the acidic groups on the resin is neutralized, and up to all of such groups may be neutralized. The degree of neutralization that is required to afford the requisite water-dispersibility for a particular resin will depend upon its chemical composition, molecular weight, and other such factors and can readily be determined by one of ordinary skill in the art through straightforward experimentation. Typically, the acid groups are neutralized at least 10%, and more preferably 40 to 60%.

The electrocoat bath may also include water-miscible or water-soluble cosolvents. Cosolvents aid in dispersing the resins and also may help to coalesce the film and/or improve flow during cure to help form a smooth coating. Useful coalescing solvents include alcohols, esters, ethers and ketones. The preferred coalescing solvents include alcohols, ethers and ketones. Specific coalescing solvents include monopropyl, monobutyl and monohexyl ethers of ethylene or propylene glycol, dimethyl, diethyl, and dipropyl ethers of ethylene or propylene, glycol, or diacetone alcohol. A small amount of a water-immiscible organic solvent such as xylene, toluene, methyl isobutyl ketone or 2-ethylhexanol may be present, also. The amount of coalescing solvent is generally between about 0 to 15 percent by weight, preferably about 0.5 to 5 percent by weight based on total weight of the resin solids.

The electrodeposition coating compositions used in the invention can contain optional ingredients such as dyes, flow control agents, catalysts, wetting agents, surfactants, UV absorbers, HALS compounds, antioxidants, defoamers and so forth. Examples of surfactants and wetting agents include alkyl imidazolines such as those available from Ciba-Geigy Industrial Chemicals as Amine C®, acetylenic alcohols such as those available from Air Products and Chemicals under the tradename Surfynol®. Surfactants and wetting agents, when present, typically amount to up to 2 percent by weight resin solids. Plasticizers are optionally included to promote flow. Examples are high boiling water immiscible materials such as ethylene or propylene oxide adducts of nonyl phenols or bisphenol A. Plasticizers can be used at levels of up to 15 percent by weight resin solids.

Curing catalysts such as tin catalysts can be used in the coating composition. Examples are dibutyltin dilaurate and dibutyltin oxide. When used, they are typically present in amounts of about 0.05 to 2 percent by weight tin based on weight of total resin solids.

The electrocoat bath should have an electroconductivity from 800 micromhos to 3000 micromhos. When conductivity is too low, it is difficult to obtain a film of desired thickness and having desired properties. On the other hand, if the composition is too conductive, problems such as the dissolution of substrate or counter electrode in the bath, uneven film thickness, rupturing of the film, or poor resistance of the film to corrosion or water spotting may result.

The coating composition according to the present invention is electrodeposited onto a substrate and then cured to form a coated article. The electrodeposition of the coating preparations according to the invention may be carried out by any of a number of processes known to those skilled in the art. The electrodeposition coating composition may be applied on any conductive substrate, such as steel, copper, aluminum, or other metals or metal alloys, to a dry film thickness of 10 to 35 $\mu$m. The article coated with the composition of the invention may be a metallic automotive part or body. After application, the coated article is removed from the bath and rinsed with deionized water. The coating may be cured under conditions appropriate for the curing mechanism employed.

Following electrodeposition, the applied coating is usually cured before other coatings, if used, are applied. When the electrocoat layer is used as a primer in automotive applications, one or more additional coating layers, such as a primer-surfacer, color coat, and, optionally, a clearcoat layer, may be applied over the electrocoat layer. The color coat may be a topcoat enamel. However, in the automotive industry, the color coat is often a basecoat that is overcoated with a clearcoat layer. The primer-surfacer, topcoat enamel, basecoat or clearcoat may be either waterborne or solventborne. The coatings can be formulated and applied in a number of different ways known in the art. For example, the resin used can be an acrylic, a polyurethane, or a polyester. Typical topcoat formulations are described in U.S. Pat. Nos. 4,791,168, 4,414,357, and 4,546,046. The coatings can be cured by any of the known mechanisms and curing agents, such as a melamine or blocked isocyanate.

The invention is further described in the following examples. The examples are merely illustrative and do not in any way limit the scope of the invention as described and claimed.

EXAMPLES

Example 1
Preparation of the Backbone Acrylic Resin with Isocyanate Functionality To a 3000 ml flask equipped with a mixer, condenser and temperature probe were added 361.0 methy amyl ketone. The solvent blend was heated to reflux (ca. 149 C.). To a separate vessel were added the following monomers: 142.2 g butyl methacrylate, 729.0 g styrene and 402.6 g tetramethylene isocyanate (Cytec's TMI®). To the monomer mix was added 127.4 g t-butylperacetate inititator. The monomer/initiator mix was added to the reaction flask over 3 hours while maintaining the temperature between 149 C. and 151 C. The reaction was held for 0.5 hours at 149– 151 C. A final initiator add of 63.8 g t-butylperacetate was made. The reaction was held for 1.5 hours at 149–151 C. The product had 79% solids. For grafting sites the polymer had an isocyanate equivalent weight of 961 g polymer solution/eq isocyanate functionality.

Example 2
Preparation of the Pigment Dispersant

To a 1000 ml flask equipped with a mixer, condenser and temperature probe were added 394.8 g of the isocyanate funtional acrylic of Example 1 above, 76.5 carbowax MPEG2000 (Anion Carbide), and 0.11 g dibutyltindilaurate. The batch was heated to 140° C. and held for 2 hours to an NCO equivalent weight of 1114. The batch was cooled to 102° C. and 99.0 g 12-hydroxysteric acid added. The reaction was held for 9 hours at 102° C. until the isocyanate equivalent weight was greater than 20K. The resin was diluted with 5.7 g propylene glycol methyl ether and 589.6 g propylen glycol propyl ether. The meq Acid was 0.615 meq acid/gram NV polymer (Acid number was 35.6 mg KOH/gram NV polymer.. A total of 18.2 g dimethylethylamine was added for salting. The meq Base was 0.413 meq base/g NV. The polymer had a molecular weight of 16,000 and a polydispersity of 3.2.

Example 3
Preparation of AnionicPigment Paste

To a 3 quart stainless steel milling pot were added 320.0 g of the pigment dispersant of Example 2 above, 865.0 g deionized water, 12.8 g carbon black, 131.2 g aluminium silicate clay, and 656.0 g titanium dioxide. The pigment and dispersant were mixed with a cowles blade until homogenous. To the pot mill was added 1960.0 g of zirconium oxide media (Zircoa Inc.). The batch was milled for 2 hours to a fineness of grind of less than 10 microns. The P/B was 5/1. The paste solids was 48.4% with a density of 11.9 pounds/gallon and a viscosity of 100 cps. The pH of the paste was 8.5.

Example 4
Preparation of an Anodic Polymer (a)

To a 1000 ml flask equipped with a mixer, condenser and temperature probe were added 83.5 g propylene glycol methy ether (PM) and 14.0 g acetone. The solvent blend was0 heated to reflux (ca. 98 C.). To a separate vessel were added the following monomers: 257.1 g of carbamate ethyl methacrylate (CEMA) @ 70% in PM, 16.0 g acrylic acid and 204.0 g butyl acrylate (BA). 6.5 g of 2,2'-Azobis-(2-methylbutyronitrile) (VAZO 67) dissolved in 12.9 g acetone was then added to the monomer mixture. The monomer/initiator mixture was added to the reaction flask over 2 hours while the temperature was maintained between 96 C. and 102 C. The reaction was held for 1.25 hours at 96–102 C. A final initiator addition of 1.8 g VAZO 67 in 1.8 g acetone was made. The reaction was helOd for 2 hours at 96–102 C. The resulting product has a molecular weight of 32,000 (by GPC) at 70% solids. The theo. Tg is 9 C. The polymer has a carbamate equivalent weight of 385 g polymer Nv/eq carbamate functionality. For anodic emulsification the polymer has a meq Acid of 0.56 grams polymer/N salting site (Acid number is 31).

Example 5
Preparation of an Anodic Emulsion Comprising Polymer (a)

To a gallon vessel were added 500.0 g of polymer (a) from Example 4, 132.3 g an amninoplast resin (melamine Cymel 1156 from Cytec) and 30.9 g of plasticizer (Synfac 8009 from Molliken Chemical). The component were mixed until homogenous.

To this was added 16.8 g of the salt of dodecylbenzesulfonic acid and oxizlidone. The emulsion was neutralized with 9.6 g dimethylethylamine. This was mixed until homogenous. A total of 1902.4 g deionized water was added in portions with good mixing. The resulting emulsion had a solids content of 20%. The pH was 7.9 and the conductivity was 753 micromros. The emulsion had a particle size of 0.22 microns. The meq acid was 0.37 and the meq base was 0.185 for a neutralization of 50%.

Example 6
Preparation/Deposition of Anodic Electrocoat Bath & Results

To a gallon vessel were added 2400 g of the principal emulsion of Example 5 above and 248 g of grey, Pb free, pigment paste of Example 3 above. The bath had a pigment/binder ratio of 0.2 and a solids content of 19%. The bath was mixed for 2 hours in an open vessel. The bath had a pH of 7.8 and a conductivity of 800 mnicromhos.

Using a DC rectifier, steel and aluminum panels were coated via anodic electrodeposition. The set voltage was 50–100 volts and 0.5 amps for 2.2 minutes. The bath temperature was 70° F.

The panels were baked at 30'×250 F. and 30×270 F. in a gas oven. The cured films had a good smooth, continuous appearance and the film build was 0.8 mil. The solvent resistance was good and passed the 100 MEK rubs test. The coating had a tukon hardness of 5 knoops. The coating had excellent adhesion to both the aluminium and steel substrates

What is claimed is:

1. A dispersant compound comprising an acrylic backbone having a plurality of pendant anionic groups and a stabilizing substituent linked to the acrylic backbone through a linkage selected from the group consisting of urethane linkages, urea linkages, β-hydroxy ester linkages, β-hydroxy amine linkages and mixtures thereof, the stabilizing substituent comprising an alkoxy-terminated alkyl or polyalkylene oxide of the formula $$-D(CHR_1CH_2O-)_nR_2,$$

wherein D is a divalent radical that is —O— or —NR$_3$—, R$_3$ is hydrogen or an alkyl group of from one to twelve carbons, R$_1$ is hydrogen or an alkyl group of from one to eight carbons, R$_2$ is an alkyl group of from one to thirty carbons, and n is an integer from one to one thousand.

2. The dispersant compound of claim 1 wherein the acrylic backbone has a number average molecular weight of from 2000 to 50,000.

3. The dispersant compound of claim 1 wherein the plurality of anionic groups result from the reaction of a plurality of carboxylic acid groups with a basic compound selected from the group consisting of organic amines, hydroxide containing compounds, and mixtures thereof.

4. The dispersant compound of claim 3 wherein the plurality of carboxylic acid groups are only partially reacted with a basic compound.

5. The dispersant compound of claim 4 wherein the plurality of carboxylic acid groups are reacted with an organic amine such that from 50 to 75% of the carboxylic acid groups are neutralized.

6. The dispersant compound of claim 3 wherein the plurality of carboxylic acid groups are reacted with one or more organic amines.

7. The dispersant compound of claim 6 wherein the plurality of carboxylic acid groups are reacted with a tertiary amine.

8. The dispersant compound of claim 1 wherein D is selected from the group consisting of —O— and —NH—.

9. The dispersant compound of claim 1 wherein R$_1$ is hydrogen and R$_2$ is methyl.

10. The dispersant compound of claim 9 wherein n is from 20 to 200.

11. The dispersant compound of claim 10, wherein n is from 30 to 70.

* * * * *